(12) United States Patent
Dong et al.

(10) Patent No.: US 11,194,233 B2
(45) Date of Patent: Dec. 7, 2021

(54) ADJUSTABLE STAND AND USE THEREOF

(71) Applicant: ZHEJIANG DAHUA TECHNOLOGY CO., LTD., Zhejiang (CN)

(72) Inventors: Liang Dong, Hangzhou (CN); Zhengchun Luo, Hangzhou (CN); Zhiyong Zhang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/009,796

(22) Filed: Sep. 2, 2020

(65) Prior Publication Data

US 2020/0401022 A1 Dec. 24, 2020

Related U.S. Application Data

(63) Continuation of application No. PCT/CN2018/123350, filed on Dec. 25, 2018.

(30) Foreign Application Priority Data

Mar. 7, 2018 (CN) .......................... 201810185348.0
Mar. 7, 2018 (CN) .......................... 201820311439.X

(51) Int. Cl.
*G03B 17/56* (2021.01)
*F16M 11/10* (2006.01)
(Continued)

(52) U.S. Cl.
CPC ........... *G03B 17/561* (2013.01); *F16M 11/04* (2013.01); *F16M 11/10* (2013.01); *F16M 11/12* (2013.01);
(Continued)

(58) Field of Classification Search
CPC ........ F16M 11/10; F16M 11/04; F16M 11/12; F16M 11/18; F16M 2200/024; G03B 17/56
(Continued)

(56) References Cited

U.S. PATENT DOCUMENTS 10,698,454 B2* 6/2020 Zeng ........................ G06F 1/188
2013/0100341 A1* 4/2013 Codd ....................... B66F 11/048
348/373
2020/0401022 A1* 12/2020 Dong ..................... F16M 11/10

FOREIGN PATENT DOCUMENTS

CN 201509248 6/2010
CN 202203615 4/2012
(Continued)

OTHER PUBLICATIONS

International Search Report in PCT/CN2018/123350 dated Mar. 28, 2019, 5 pages.
(Continued)

*Primary Examiner* — Clayton E. LaBalle
*Assistant Examiner* — Kevin C Butler
(74) *Attorney, Agent, or Firm* — Metis IP LLC

(57) ABSTRACT

The present disclosure relates to a stand. The stand may include a supporting component, a rotation component, a rotation limiting component, and an adapter ring. The rotation component may be rotatably connected to the supporting component and may be configured to rotate about a first rotation axis. The adapter ring may be placed between the rotation component and the rotation limiting component. The rotation component may include first ratchet teeth on a first side of the rotation component. The rotation limiting component may include second ratchet teeth on a second side of the rotation limiting component facing the first side. The adapter ring may include third ratchet teeth and fourth ratchet teeth on a third side and a fourth side of the adapter (Continued)

ring, respectively. The third ratchet teeth may be engaged with the first ratchet teeth and the fourth ratchet teeth may be engaged with the second ratchet teeth.

20 Claims, 8 Drawing Sheets

(51) Int. Cl.
 *F16M 11/18* (2006.01)
 *F16M 11/04* (2006.01)
 *F16M 11/12* (2006.01)
(52) U.S. Cl.
 CPC ............ *F16M 11/18* (2013.01); *G03B 17/56* (2013.01); *F16M 2200/024* (2013.01)
(58) Field of Classification Search
 USPC ........................................................ 396/428
 See application file for complete search history.

(56) References Cited

FOREIGN PATENT DOCUMENTS

| CN | 205900765 | | 1/2017 |
|---|---|---|---|
| CN | 107278247 | A | 10/2017 |
| CN | 206539848 | U | 10/2017 |
| CN | 207018765 | U | 2/2018 |
| CN | 108317364 | A | 7/2018 |
| CN | 208123796 | U | 11/2018 |
| WO | 2012109351 | A1 | 8/2012 |

OTHER PUBLICATIONS

Written Opinion in PCT/CN2018/123350 dated Mar. 28, 2019, 5 pages.
The Extended European Search Report in European Application No. 18908627.5 dated Feb. 12, 2021, 7 pages.

\* cited by examiner

US 11,194,233 B2

ADJUSTABLE STAND AND USE THEREOF

CROSS-REFERENCE TO RELATED APPLICATIONS

This application is a continuation of International Application No. PCT/CN2018/123350 field on Dec. 25, 2018, which claims priority to Chinese Patent Application No. 201810185348.0 filed on Mar. 7, 2018, and Chinese Patent Application No. 201820311439.X filed on Mar. 7, 2018, the contents of each of which are hereby incorporated by reference.

TECHNICAL FIELD

The present disclosure generally relates to an adjustable stand, and in particular, to an adjustable stand that can achieve a fine adjustment by allowing rotations by small rotation angles.

BACKGROUND

A camera, as convenient equipment for recording scenes in a particular moment, is widely used all over the world. Sometimes, a camera may be mounted on a camera stand to improve the capturing stability of the camera. Currently, a camera stand may include a pair of gears arranged along its rotation axis to make it easy to be adjusted. An operator may rotate the camera stand and the camera to a desired detecting angle. However, the minimum rotation angle of the current camera stand is related to the number of gear teeth in the gears. For example, if the number of the gear teeth is 51, the minimum rotation angle may be 360/51, approximately 7 degrees, e.g., any rotation of the camera stand must be a multiple of 7 degrees (e.g., 0, 7, 14, 70 degrees). In order to reduce the minimum rotation angle, the number of gear teeth has to be increased accordingly. For example, the number of gear teeth has to be increased to almost 360 in order to achieve a minimum rotation of 1 degree. The gear with 360 gear teeth is neither easy to be manufactured nor economic. Therefore, it is desired to provide an adjustable stand that can achieve rotations of fine rotation angles without significantly increasing the complexity of the adjustable stand.

SUMMARY

According to an aspect of the present disclosure, a stand is provided. The stand may include a supporting component, a rotation component, a rotation limiting component, and an adapter ring. The rotation component may be rotatably connected to the supporting component. The rotation component may be configured to rotate about a first rotation axis. The rotation component may include a plurality of first ratchet teeth arranged along a first circle on a first side of the rotation component. The rotation limiting component may include a plurality of second ratchet teeth arranged along a circle on a second side of the rotation limiting component. The second side of the rotation limiting component may face the first side of the rotation component. The adapter ring may be placed between the rotation component and the rotation limiting component. The adapter ring may include a plurality of third ratchet teeth arranged along a third circle on a third side of the adapter ring and a plurality of fourth ratchet teeth arranged along a fourth circle on a fourth side of the adapter ring. The plurality of third ratchet teeth may be engaged with the plurality of first ratchet teeth and the plurality of fourth ratchet teeth are engaged with the plurality of second ratchet teeth.

In some embodiments, each of at least some of the plurality of third ratchet teeth and at least some of the plurality of fourth ratchet teeth may include a steep slope and a gradual slope. The steep slope and the gradual slope may form a tooth tip. A first angle formed between two teeth tips of two adjacent third ratchet teeth with respect to a center of the third circle may be different from a second angle formed between two teeth tips of two adjacent fourth ratchet teeth with respect to a center of the fourth circle.

In some embodiments, a difference between the first angle and the second angle may be between 0.3 and 0.7 degrees.

In some embodiments, a rotation direction of the third ratchet teeth may be the same as a rotation direction of the fourth ratchet teeth.

In some embodiments, the supporting component may be rotatably connected to a base, and the supporting component rotates about a second rotation axis perpendicular to the first rotation axis.

In some embodiments, the rotation component may be operably connected to a camera.

In some embodiments, the stand may further include a fastener configured to limit movement of at least one of the supporting component, the rotation component, the adapter ring, or the rotation limiting component about the first rotation axis.

In some embodiments, each of the supporting component, the rotation component, the adapter ring, and the rotation limiting component may include a hole along the first rotation axis. The fastener may include a bolt passing through the holes of the supporting component, the rotation component, the adapter ring, and the rotation limiting component. The fastener may further include a nut paired with the bolt. The nut may be configured to limit the movement of the supporting component, the rotation component, the adapter ring, and the rotation limiting component about the first rotation axis.

In some embodiments, the fastener may further include a spring installed on the bolt between a head of the bolt and the holes. The spring may be configured to force an engagement between the plurality of third ratchet teeth and the plurality of first ratchet teeth or an engagement between the plurality of fourth ratchet teeth and the plurality of second ratchet teeth.

In some embodiments, when the rotation component rotates at a first direction about the first rotation axis, the adapter ring may be static with respect to the rotation component. When the rotation component rotates at a second direction about the first rotation axis, the adapter ring may be static with respect to the rotation limiting component, the second direction being different from the first direction.

According to another aspect of the present disclosure, a system is provided. The system may include an imaging apparatus and a stand connected to the imaging apparatus. The stand may include a supporting component, a rotation component, a rotation limiting component, and an adapter ring. The rotation component may be rotatably connected to the supporting component. The rotation component may be configured to rotate about a first rotation axis. The rotation component may include a plurality of first ratchet teeth arranged along a first circle on a first side of the rotation component. The rotation limiting component may include a plurality of second ratchet teeth arranged along a circle on a second side of the rotation limiting component. The second side of the rotation limiting component may face the first side of the rotation component. The adapter ring may be placed between the rotation component and the rotation limiting component. The adapter ring may include a plurality of third ratchet teeth arranged along a third circle on a third side of the adapter ring and a plurality of fourth ratchet teeth arranged along a fourth circle on a fourth side of the adapter ring. The plurality of third ratchet teeth may be engaged with the plurality of first ratchet teeth and the plurality of fourth ratchet teeth are engaged with the plurality of second ratchet teeth.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not drawn to scale. These embodiments are non-limiting exemplary embodiments, in which like reference numerals represent similar structures throughout the several views of the drawings, and wherein.

DETAILED DESCRIPTION

Figure 1:
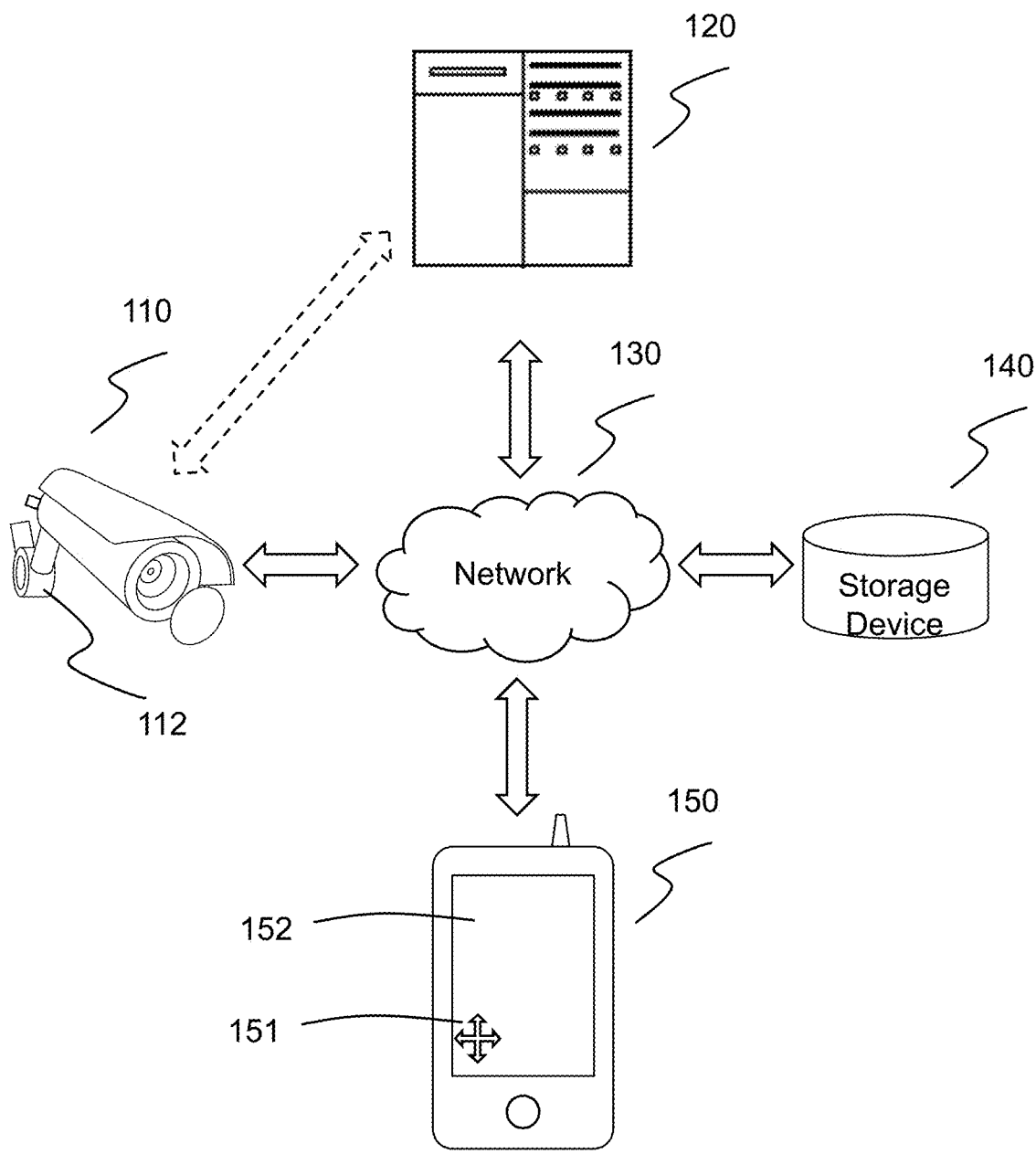
FIG. 1 is a schematic diagram of an exemplary monitoring system 100 according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of portions and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

In order to make the purpose, technical solution, and advantages of the present disclosure clearer, the present disclosure will be further described in detail below with reference to the accompanying drawings and embodiments. It should be understood that the specific embodiments described herein are merely illustrative of the present disclosure and are not intended to limit the present disclosure.

The present disclosure relates to an adjustable stand that is capable of achieving fine adjustment by allowing rotations by fine rotation angles. The stand may include a rotation component, an adapter ring and a rotation limiting component. The rotation component may include first ratchet teeth, and the rotation limiting component may include second ratchet teeth. The adapter ring may include third ratchet teeth and fourth ratchet teeth on two sides of the adapter ring. The first ratchet teeth of the rotation component may be matched and engaged with the third ratchet teeth of the adapter ring, and the second ratchet teeth of the rotation limiting component may be matched and engaged with the fourth ratchet teeth of the adaptor ring. The number (or count) of the third ratchet teeth may be different from the number (or count) of the fourth ratchet teeth while the rotation direction of the third ratchet teeth may be the same as the rotation direction of the fourth ratchet teeth. The angle between the third ratchet teeth may be A degrees, and the angle between the fourth ratchet teeth may be B degrees. By rotating the rotating component back and forth, a rotation of (A-B) degrees (or (B-A) degrees depending on the rotation directions and orders of rotation) may be achieved. The following descriptions are provided with reference to an adjustable stand being a camera stand. It is understood that it is for illustration purposes and not intended to be limiting. Embodiments of an adjustable stand described herein may be used with a device other than a camera to provide fine adjustment of the device by allowing rotations by fine rotation angles.

FIG. 1 is a schematic diagram of an exemplary monitoring system according to some embodiments of the present disclosure. As illustrated in FIG. 1, monitoring system 100 may include a camera 110, a processor 120, a network 130, a storage device 140, and a mobile device 150.

The camera 110 may be a device configured to capture one or more images. The captured images may be raw image data, a still image, a video, a streaming video, or a video frame obtained from a video. For example, the camera 110 may be a digital camera, a web camera, a smart phone, a tablet, a laptop, a video gaming console equipped with a web camera, a camera with multiple lenses, etc. In some embodiments, the camera 110 may include more than one camera configured to capture images. The camera 110 may be configured to capture two-dimensional (2D) images and/or three-dimensional (3D) images. For example, camera 110 may be a static camera, a pan-tilt-zoom camera, a moving camera, a stereoscopic camera, a structured light camera, a time-of-flight camera, etc. In some embodiments, camera 110 may also be a camera equipped with a time-of-flight device, a Kinect sensor, a 3D laser scanner, a photographic scanner, etc. The type of camera 110 may vary, depending on the installation location and/or the type of objects to be monitored. In some embodiments, camera 110 may transmit the images captured to the processor 120, the storage device 140, or the mobile device 150.

The camera 110 may be installed on a camera stand 112. The camera stand 112 may be a rotatable stand that may control the orientation or detecting direction of the camera 110 (or the lens of the camera 110). The camera stand 112 may include at least one rotation component (e.g., the rotation component 320, the supporting component 330) configured to facilitate rotations of, e.g., 180 degrees or 360 degrees in multiple directions. In some embodiments, the camera stand 112 may be controlled by an operator or a controlling mechanism (e.g., a motor, a driving circuit, a controller). For example, an operator may rotate the camera stand 112 to a direction as he or she wants. As another example, the controlling mechanism may receive an adjustment instruction from the processor 120 or the mobile device 150 and control the camera stand 112 to rotate accordingly.

The processor 120 may process an image generated by the camera 110 or retrieved from another component in the monitoring system 100 (e.g., the storage device 140, the mobile device 150, the network 130). The processor 120 may evaluate the quality of the image and/or correct the image. For example, the processor 120 may correct an image if the image is determined to be unsatisfactory. The processed or corrected image may be transmitted to the storage device 140 or the mobile device 150 via the network 130. The processor 120 may generate an adjustment instruction based on, for example, a feature of an object, an image of an object, a video of an object, or the like, or a combination. The adjustment instruction may be used to adjust the camera stand 112. For example, the processor 120 may generate an adjustment instruction to cause the camera 110 to track an object in order for the camera 110 to capture an image of the object. In some embodiments, the processor 120 may be integrated with the camera 110 as an integrated component to perform the functions of the camera 110 and/or the processor 120.

The processor 120 may be any suitable device that is capable of processing an image. For example, the processor 120 may include a high-performance computer specializing in image processing or transaction processing, a personal computer, a portable device, a server, a microprocessor, an integrated chip, a digital signal processor (DSP), a tablet computer, a personal digital assistant (PDA), a mobile phone, or the like, or a combination thereof.

In some embodiments, the processor 120 may include one or more processing engines (e.g., single-core processing engine(s) or multi-core processor(s)). Merely by way of example, the processor 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 130 may facilitate communications between various components of the monitoring system 100. The network 130 may be a single network, or a combination of various networks. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. The network 130 may also include various network access points, e.g., wired or wireless access points such as one or more base stations or Internet exchange points through which a data source may connect to the network 130 in order to transmit information via the network 130. For example, the camera 110 and the processor 120 may transmit a raw image or processed image to the mobile device 150 and/or the storage device 140 via the network 130. As another example, the mobile device 150 and/or the processor 120 may transmit adjustment instructions to the camera 110 or the camera stand 112 via the network 130. In some embodiments, the camera 110 may be connected with the processor 120 via the network 130. In some embodiments, the camera 110 may be directly connected with the processor 120 to exchange data or information as indicated by the bidirectional arrow in dashed lines in FIG. 1.

The storage device 140 may store data and/or instructions. The data may include an image (e.g., an image obtained by the camera 110), a processed image (e.g., an image processed by the processor 120), an instruction (e.g., an adjustment instruction generated by the processor 120 and/or the mobile device 150), etc. In some embodiments, the storage device 140 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The mobile device 150 may be configured to display images and/or generate instructions. For example, the mobile device 150 may be connected with the camera 110, the processor 120, and/or the storage device 140 via the network 130. The mobile device 150 may receive raw image data from the camera 110 or processed image data from the processor 120. The mobile device may display the raw image data or processed image data on a display 152 via a user interface (not shown in FIG. 1). In some embodiments, the mobile device 150 may include a control tool configured to adjust the displayed image data. For example, the control tool may include one or more physical buttons or control bars installed on or connected to the mobile device 150. As another example, the control tool may be a virtual tool (e.g., the adjustment icon 151) displayed on the display 152 via the user interface. Merely by way of example, the adjustment icon 151 may include a cross with four arrows in four directions (e.g., up, down, left, right). A user may touch one or more of the four arrows, and the mobile device may generate an adjustment instruction according to the touched one or more arrows. The mobile device 150 may transmit the adjustment instruction to the camera 110 via the network 130. The camera stand 112 or a component thereof (e.g., a controller, a driving circuit, a motor) may adjust the orientation of the camera 110 based on the adjustment instruction. For example, if a user touches an "up" arrow, an adjustment instruction of "rotating upwards" may be generated by the mobile device 150 and transmitted to the camera stand 112. The camera stand 112 may then be caused to rotate upwards according to the adjustment instruction. In some embodiments, the camera 110 may capture new image data after the orientation of the camera 110 is adjusted based on the adjustment instruction. The new image data may be transmitted to the processor 120, the storage device 140, and/or the mobile device 150.

Figure 2:
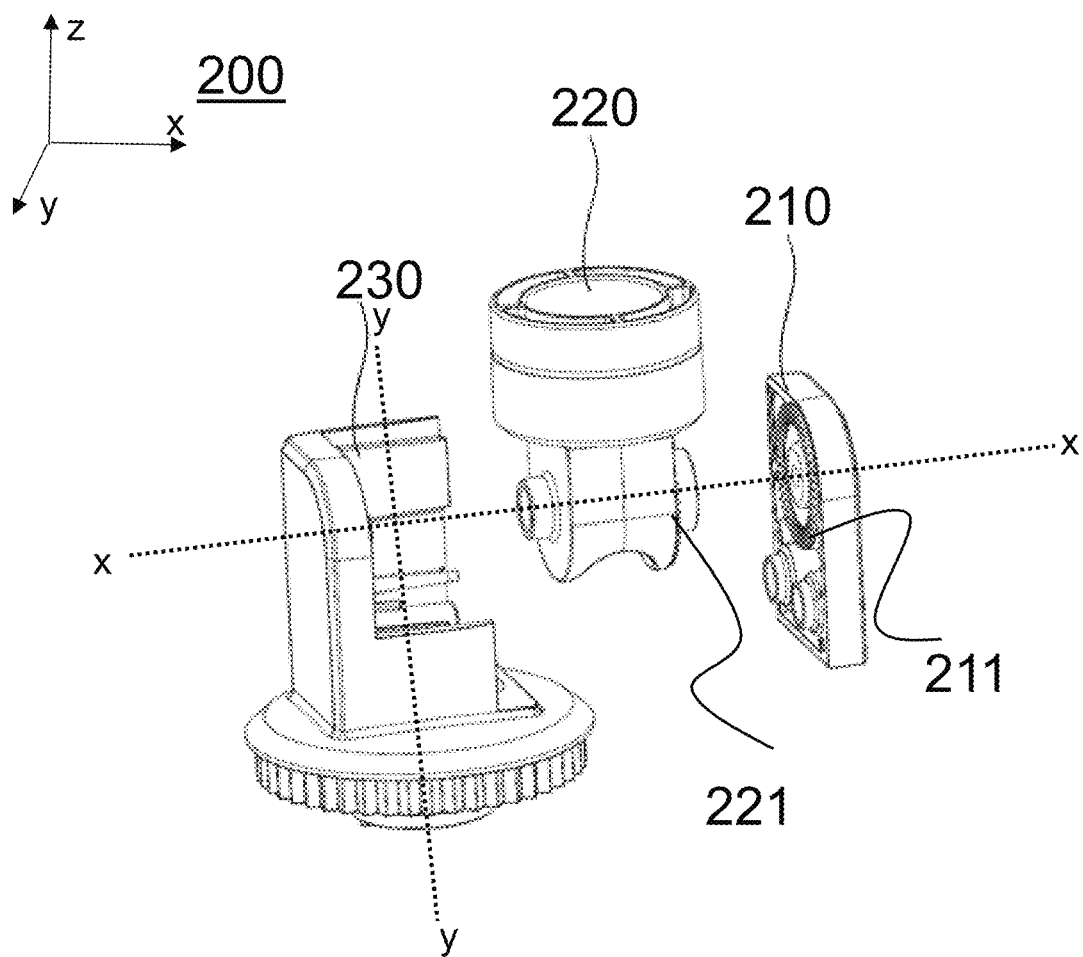
FIG. 2 is an exploded view of a prior art camera stand.

FIG. 2 is an exploded view of a prior art camera stand. As shown in FIG. 2, camera stand 200 may include a rotation limiting component 210, a rotation component 220, and a supporting component 230. The rotation limiting component 210 may include a plurality of first gear teeth 211 arranged along a first circle. The rotation component 220 may include a plurality of second gear teeth 221 arranged along a second circle. The plurality of second gear teeth 221 of the rotation component 220 may be matched with the first gear teeth 211 of the rotation limiting component 210. When the rotation component 220 and the rotation limiting component 210 are engaged, the plurality of first gear teeth 211 of the rotation limiting component 210 may be engaged or in mesh with the second gear teeth 221 of the rotation component 220. The rotation component 220 may be rotatably connected to the supporting component 230.

In some embodiments, the rotation component 220 may be driven to rotate about the x-x axis (or referred to as a first rotation axis). Because the rotation component 220 and the rotation limiting component 210 are engaged through the first gear teeth 211 and the second gear teeth 221, the minimum rotation angle may be related to the number (or count) of the first gear teeth 211 (or the second gear teeth 221 as they have the same number or count of teeth). For example, if the number (or count) of the first gear teeth is 51, the minimum rotation angle may be approximately 7 degrees, e.g., any rotation of the rotation component 220 about the x-x axis must be a multiple of 7 degrees (e.g., 0, 7, 14, 70 degrees). Thus, the camera stand 200 cannot achieve rotations of rotation angles smaller than 7 degrees (e.g., 0.3 degrees, 0.7 degrees, 1 degree). In order to reduce the minimum rotation angle, the number (or count) of the gear teeth of the rotation component 220 and/or of the rotation limiting component 210 may have to be increased accordingly. For example, the number (or count) of gear teeth has to be increased to 360 in order to achieve a minimum rotation of 1 degree. A gear component with 360 gear teeth is neither easy to be manufactured nor economic. FIGS. 3-8 and the corresponding descriptions provide embodiments of a modified camera stand to solve the problems existed in the prior art camera stand 200 illustrated in FIG. 2.

Figure 3:
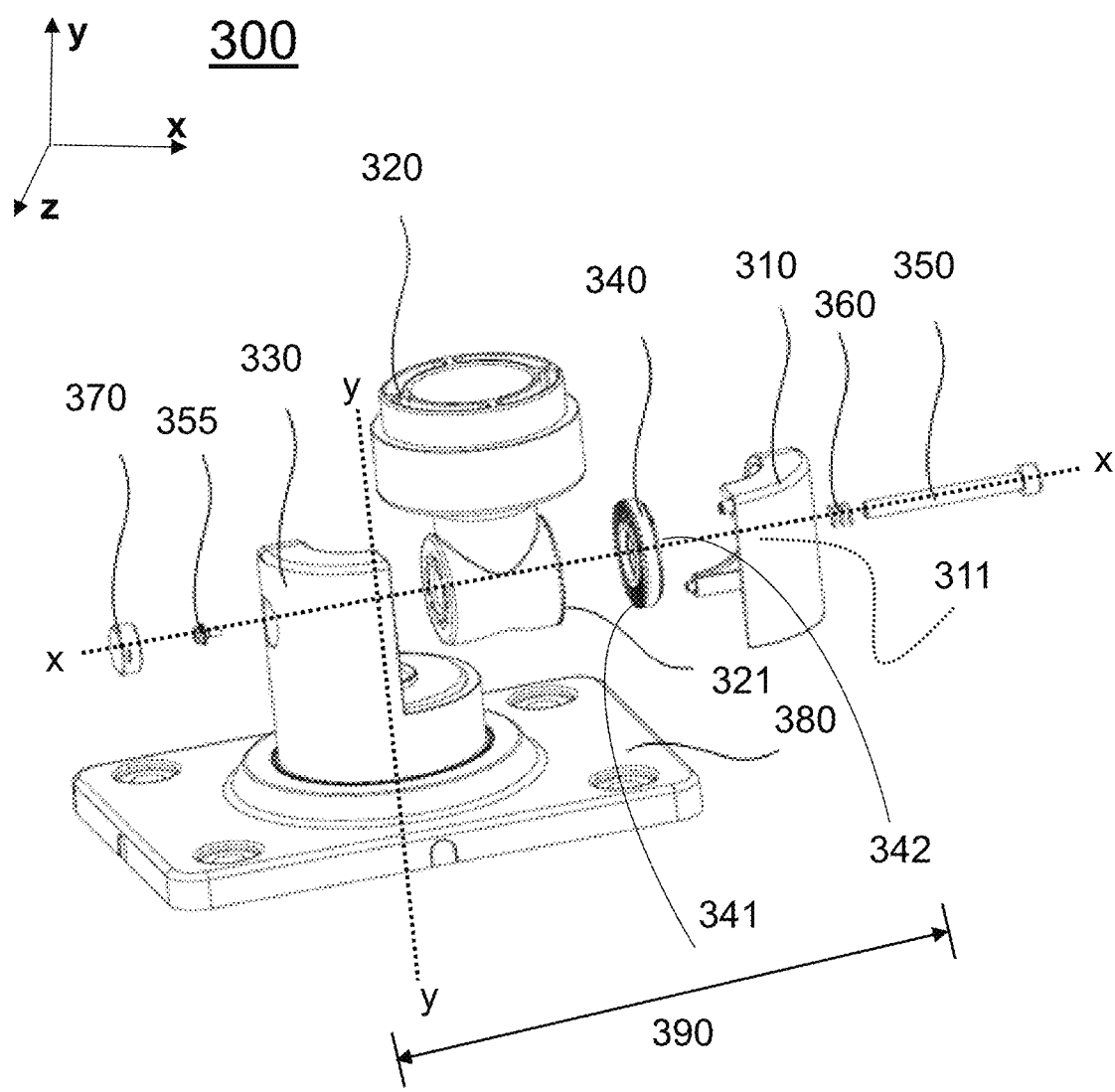
FIG. 3 is an exploded view of an exemplary camera stand according to some embodiments of the present disclosure.

FIG. 3 is an exploded view of an exemplary camera stand according to some embodiments of the present disclosure. As shown in FIG. 3, the camera stand 300 may include a rotation limiting component 310, a rotation component 320, a supporting component 330, an adapter ring 340, and a base 380. The rotation component 320 may include a plurality of first ratchet teeth 321 arranged along a first circle on a first side (e.g., the right-hand side in the front view) of the rotation component 320. The rotation limiting component 310 may include a plurality of second ratchet teeth 311 arranged along a second circle on a second side (e.g., the left-hand side in the front view) of the rotation limiting component 310. The first side of the rotation component 320 may face the second side of the rotation limiting component 310.

It should be noted that the names of terms used in the present disclosure are not limiting. For example, the rotation limiting component 310 is named as such merely because some parts of the rotation limiting component 310 may limit the range of rotation angles of the rotation component 320 to, e.g., from −90 degrees to 90 degrees. A person having ordinary skill in the art may change the configuration of the rotation limiting component 310 such that the changed rotation limiting component 310 does not limit the range of rotation angles of the rotation component 320. Such changes are also within the protection scope of the present disclosure. As another example, even though the name of the supporting component 330 does not contain a term "rotation" or "rotate," the supporting component 330 may be able to rotate, e.g., about the y-y axis (or referred to as the second rotation axis) with respect to the base 380. It should be understood that terms such as "top," "bottom," "upper," "lower," "vertical," "lateral" "above," "below," "upward(s)," "downward(s)," "left-hand side," "right-hand side," "vertical," "horizontal," and other such spatial reference terms are used in a relative sense to describe the positions or orientations of certain surfaces/parts/components of an adjustable stand in relationship to other such features of the adjustable stand when the adjustable stand is in a normal operating position and may change if the position or orientation of the adjustable stand changes.

The adapter ring 340 may be placed between the rotation component 320 and the rotation limiting component 310. The adapter ring 340 may include a plurality of third ratchet teeth 341 arranged along a third circle on a third side (e.g., the left-hand side in the front view) of the adapter ring 340. The plurality of third ratchet teeth 341 of the adaptor ring 340 may be engaged with the plurality of first ratchet teeth 321 of the rotation component 320. For example, the number (or count), sizes, and/or shapes of the plurality of third ratchet teeth 341 may be the same as those of the plurality of first ratchet teeth 321. When the rotation component 320 and the adapter ring 340 are engaged (e.g., when the camera stand 300 is assembled), the plurality of first ratchet teeth 321 of the rotation component 320 may be engaged or in mesh with the plurality of third ratchet teeth 341 of the adaptor ring 340. The adapter ring 340 may further include a plurality of fourth ratchet teeth 342 arranged along a fourth circle on a fourth side (e.g., the ring-hand side in the front view) of the adapter ring 340. The plurality of fourth ratchet teeth 342 of the adaptor ring 340 may be engaged with the plurality of second ratchet teeth 311 of the rotation limiting component 310. For example, the number (or count), sizes, and/or shapes of the plurality of fourth ratchet teeth 342 may be the same as those of the plurality of second ratchet teeth 311. When the adapter ring 340 and the rotation limiting component 310 are engaged (e.g., when the camera stand 300 is assembled), the plurality of fourth ratchet teeth 342 of the adaptor ring 340 may be engaged or in mesh with the plurality of second ratchet teeth 311 of the rotation limiting component 310. In some embodiments, the number (or count) of the plurality of first ratchet teeth 321 may be different from the number (or count) of the plurality of second ratchet teeth 311. The number (or count) of the plurality of the plurality of third ratchet teeth 341 may be different from the number (or count) of the plurality of fourth ratchet teeth 342

In some embodiments, a ratchet tooth (e.g., a first ratchet tooth 321, a second ratchet tooth 311, a third ratchet tooth 341, a fourth ratchet tooth 342) may have an individual rotation direction. For example, the ratchet tooth may include a gradual slope and a steep slope. When a ratchet tooth A is engaged with a ratchet tooth B, the gradual slope of the ratchet tooth A may contact or face the gradual slope of the ratchet tooth B. When ratchet tooth A rotates, there may be only one rotation direction that may allow the gradual slope of the ratchet tooth A to slip over the gradual slope of the ratchet tooth B (when rotated in the other rotation direction, the steep slope of the ratchet tooth A may be stuck by the steep slope of the ratchet tooth B and cannot move), and that rotation direction may be designated as the rotation direction of ratchet tooth A. In some embodiments, for a ratchet tooth A and a ratchet tooth B to be engaged with each other, their rotation directions may be opposite to each other. More descriptions regarding the rotation direction of ratchet teeth may be found elsewhere in the present disclosure, e.g., FIGS. 4 and 5A-5D, and the descriptions thereof.

In some embodiments, the rotation direction of the plurality of third ratchet teeth 341 may be the same as the rotation direction of the plurality of fourth ratchet teeth 342. The rotation component 320 may be configured to rotate about the x-x axis. When the rotation component 320 rotates in a first direction about the x-x axis, the rotation component 320 may remain static with respect to the adapter ring 340 while the adapter 340 (together with the rotation component 320) may rotate with respect to the rotation limiting component 310. When the rotation component 320 rotates in a second direction about the x-x axis (opposite to the first direction), the rotation component 320 may rotate with respect to the adapter ring 340 while the rotation limiting component 310 may remain static with respect to the adapter ring 340. More descriptions regarding the relative movements between the rotation component 320 and the adapter ring 340 and the relative movements between the adapter ring 340 and the rotation limiting component 310 may be found elsewhere in the present disclosure, e.g., FIGS. 7A-7D and the description thereof.

In some embodiments, when the supporting component 330 rotates with respect to the adapter ring 340, the minimum rotation angle may be an angle of rotation when each of the first ratchet teeth 321 slips over only one corresponding third ratchet tooth 341. When the adapter ring 340 rotates with respect to the rotation limiting component 310, the minimum rotation angle may be an angle of rotation when each of the fourth ratchet teeth 342 slips over only one corresponding second ratchet tooth 311. For example, a tooth tip (e.g., tooth tip 413 in FIG. 4) may be formed between the gradual slope and the steep slope of each of the first ratchet teeth 321 of the rotation component 320; a tooth tip may be formed between the gradual slope and the steep slope of each of the third ratchet teeth 341 of the adaptor ring 340. The minimum rotation angle (e.g., angle 630 in FIG. 6A) of the first ratchet teeth 321 may be the angle formed between two teeth tips of two adjacent first ratchet teeth 321 of the rotation component 320 with respect to a center of the first circle on the first side of the rotation component 320. This minimum rotation angle of the first ratchet teeth may also be referred to as the angle between the first ratchet teeth 321. The minimum rotation angle of the third ratchet teeth 341 may be the angle formed between two teeth tips of two adjacent third ratchet teeth 341 of the adaptor ring 340 with respect to a center of the third circle on the third side of the adaptor ring 340. The minimum rotation angle of the third ratchet teeth may also be referred to as the angle between the third ratchet teeth 341. Merely by way of example, the minimum rotation angle of ratchet teeth arranged in a circle may be calculated as 360 degrees divided by the number (or count) of the ratchet teeth. In some embodiments, the angle between the first ratchet teeth 321 of the rotation component 320 may be the same as the angle between the third ratchet teeth 341 of the adaptor ring 340. The angle between the second ratchet teeth 311 may be the same as the angle between the fourth ratchet teeth 342. In some embodiments, there may be a difference between the angle between the third ratchet teeth 341 and the angle between the fourth ratchet teeth 342. For example, the difference may be in the range of 0.3 to 0.7 degrees, such as 0.3 degrees, 0.4 degrees, 0.5 degrees, 0.6 degrees, 0.7 degrees, etc. As another example, the difference may be any number that is less than the angle between the third ratchet teeth 341 (or the angle between the fourth ratchet teeth 342). More descriptions regarding the minimum rotation angle may be found elsewhere in the present disclosure, e.g., FIG. 6A and the descriptions thereof.

As mentioned above, the angle between the third ratchet teeth 341 may be different from the angle between the fourth ratchet teeth 342. By rotating the rotating component 320 back and forth, fine rotation angles may be achieved. For example, the angle between the third ratchet teeth may be 7 degrees, and the angle between the fourth ratchet teeth may be 6.5 degrees. Assuming the rotation direction of the third ratchet teeth is anticlockwise about the x-x axis in the left view (or upwards in the front view), and the rotation direction of the fourth ratchet teeth is clockwise about the x-x axis in the left view (or downwards in the front view). By rotating the rotation component 320 first downwards about the x-x axis and then upwards about the x-x axis, the rotation component 320 may achieve a rotation of 0.5 degrees downwards about the x-x axis. In order to achieve a rotation of 35 degrees, the rotation component 320 may be rotated downwards for 5 ratchet teeth. In order to achieve a rotation of 8 degrees, the rotation component 320 may be rotated downwards for 3 ratchet teeth and upwards for 2 ratchet teeth. By rotating the rotation component 320 upwards for A ratchet teeth and downwards for B ratchet teeth (or vice versa), a desired angle may be achieved.

In some embodiments, the rotation component 320 may be connected to the supporting component 330 via a hole or groove on the bottom surface of the rotation component 320. The supporting component 330 may be rotatably connected to the base 380. For example, the supporting component 330 may rotate about the y-y axis (or referred to as a second rotation axis) with respect to the base 380. The y-y axis may be a vertical axis perpendicular to the x-x axis. The rotation of the supporting component 330 about the y-y axis may cause the rotation component 320, the adapter ring 340, and the rotation limiting component 310 to rotate simultaneously as a rigid body with the supporting component 330. In some embodiments, the bottom surface of the base 380 may be attached to a surface of a fixed structure (e.g., a wall, a ceiling, a floor) or a movable structure (e.g., a stand support such as a tripod, a shelf). The rotation component 320 may be operably connected to a camera (e.g., the camera 110) to allow an adjustment of the position or orientation of the camera.

In some embodiments, the camera stand 300 may further include a fastener configured to limit the movements of the supporting component 330, the rotation component 320, the adapter ring 340, and/or the rotation limiting component 310 about the x-x axis. The fastener may limit the overall width 390 between the side of the supporting component 330 that is not attached to the rotation component 320 (e.g., the left-hand side of the supporting component 330) and the side of the rotation limiting component 310 that does not include the second ratchet teeth (e.g., the right-hand side of the rotation limiting component 310). In some embodiments, each of the supporting component 330, the rotation component 320, the adapter ring 340, and the rotation limiting component 310 may include a through hole along the x-x axis (as shown in FIG. 3). Merely by way of example, the fastener may include a bolt 350 and a nut 355 used in pairs. The bolt 350 may pass through the holes of the supporting component 330, the rotation component 320, the adapter ring 340, and the rotation limiting component 310. The nut 355 may be configured to limit the movement of the supporting component 330, the rotation component 320, the adapter ring 340, and the rotation limiting component 310 about the x-x axis. For example, the bolt 350 may be 20 centimeters (cm) long of which 10 cm are inside the holes of the supporting component 330, the rotation component 320, the adapter ring 340, and the rotation limiting component 310. By moving the nut 355 in different positions along the bolt 350, the width between the left-hand side of the supporting component 330 and the right-hand side of the rotation limiting component 310 about the x-x axis may be limited to from 10 cm (when the nut 355 abuts the surface of the supporting component 330) to 20 cm (when the nut 355 is placed at the end of the bolt 350).

In some embodiments, a spring 360 may be installed on the bolt 350 between a head of the bolt 350 and the holes (e.g., the hole near the surface of the rotation limiting component 310). For example, the spring 360 may be relexed at an initial configuration of the camera stand 300. When the rotation component 320 rotates, because the gradual slopes of the ratchet teeth cause the ratchet teeth to move not only about the y-y axis but also about the x-x axis, the spring 360 may be compressed (see FIG. 5B or FIG. 5C). The compressed spring 360 may generate a compressive force to the rotation limiting component 310 (and the head of the bolt 350). Such compressive force may force an engagement between the plurality of third ratchet teeth 341 of the adaptor ring 340 and the plurality of first ratchet teeth 321 of the rotation component 320 or an engagement between the plurality of fourth ratchet teeth 342 of the adaptor ring 340 and the plurality of second ratchet teeth 311 of the rotation limiting component 310 (e.g., forcing the second ratchet component 520 to be engaged with the first ratchet component 510, from a first configuration in FIG. 5C to a second configuration in FIG. 5D). In some embodiments, the camera stand may further include a cap 370 detachably placed at one end of the through hole of the supporting component 330 covering the nut 355 to protect the nut 355 from being damaged. The cap 370 may include a brand, a logo, an image, an icon, a name, a sign, etc., on it.

Figure 4:
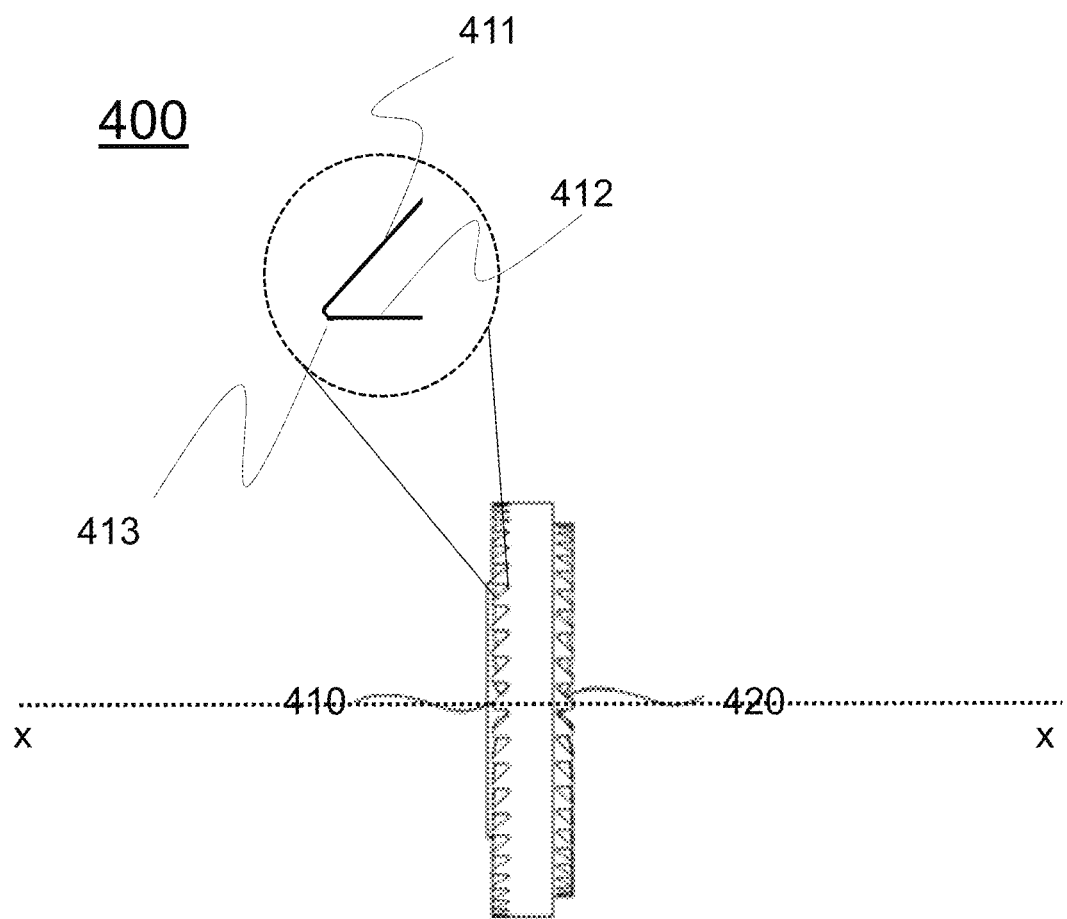
FIG. 4 is a front view of an exemplary adapter ring according to some embodiments of the present disclosure.

FIG. 4 is a front view of an exemplary adapter ring according to some embodiments of the present disclosure. The adapter ring 400 may be a disk-shaped component with two types of ratchet teeth 410 and 420 arranged on different sides of its surfaces. The adapter ring 400 provides an example of the adapter ring 340. The ratchet teeth 410 may correspond to the plurality of third ratchet teeth 341 of the adaptor ring 340, and the ratchet teeth 420 may correspond to the plurality of fourth ratchet teeth 342 of the adaptor ring 340. In some embodiments, the ratchet teeth 410 may each include a gradual slope 411 and a steep slope 412. When the adapter ring 400 rotates upwards about the horizontal axis, the gradual slope 411 of the ratchet teeth 410 may slip over the gradual slope of ratchet teeth of a component (e.g., the first ratchet teeth 321 of the rotation component 320) contacting the ratchet teeth 410). Thus, the rotation direction of the ratchet teeth 410 may be upwards in the front view (or anticlockwise in the left view) about the x-x axis or horizontal axis. The ratchet teeth 420 may also each include a gradual slope and a steep slope. By a similar analysis, when the adapter ring 400 rotates upwards about the horizontal axis, the rotation direction of the ratchet teeth 420 may be determined to be the same as the rotation direction of the ratchet teeth 410 (also be upward about the horizontal axis).

FIGS. 5A-5D are schematic diagrams illustrating relative movements between two ratchet components according to some embodiments of the present disclosure. FIG. 5A-5D may illustrate how two ratchet components move with respect to each other when an external force (e.g., a linear force, a rotational force) is applied to at least one of them. Similar relative movement may occur between the first ratchet teeth 321 of the rotation component 320 and the third ratchet teeth 341 of the adaptor ring 340, or between the second ratchet teeth 311 of the rotation limiting component 310 and the fourth ratchet teeth 342 of the adaptor ring 340, when the rotation component 320 is rotated.

Figures 5A, 5B:
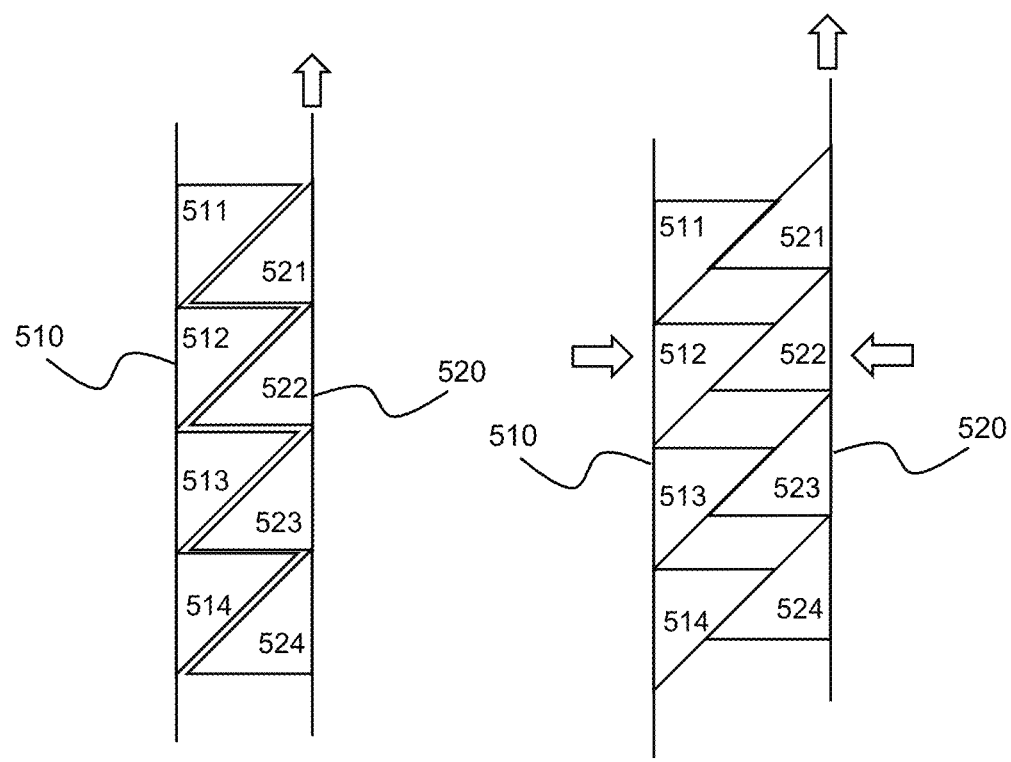
FIGS. 5A-5D are schematic diagrams illustrating relative movements between two ratchet components according to some embodiments of the present disclosure.

As shown in FIGS. 5A-5D, the first ratchet component 510 may include four first ratchet teeth 511, 512, 513, and 514, and the second ratchet component 520 may include four second ratchet teeth 521, 522, 523, and 524. Referring to FIG. 5A, the first ratchet component 510 and the second ratchet component 520 may be at their respective initial positions. The first ratchet component 510 may be engaged with the second ratchet component 520. For example, the four first ratchet teeth 511-514 may be engaged with the second first ratchet teeth 521-524, respectively. The first ratchet teeth 511-514 and the second ratchet teeth 521-524 may each include a steep slope and a gradual slope. The gradual slope of one of the first ratchet teeth 511-514 may contact the gradual slope of one of the second ratchet teeth 521-524, respectively, when engaged. In some embodiments, an upward force (or a rotational force) may be applied on the second ratchet component 520 and the second ratchet component 520 may slide upwards along the gradual slopes as shown in FIG. 5B. In some embodiments, a compression component (not shown in FIGS. 5A-5D) such as the spring 360, may apply a compressive force on both the first ratchet component 510 and the second ratchet component 520 when the second ratchet section 520 is sliding upwards (displaced from the initial position illustrated in FIG. 5A).

Figures 5C, 5D:
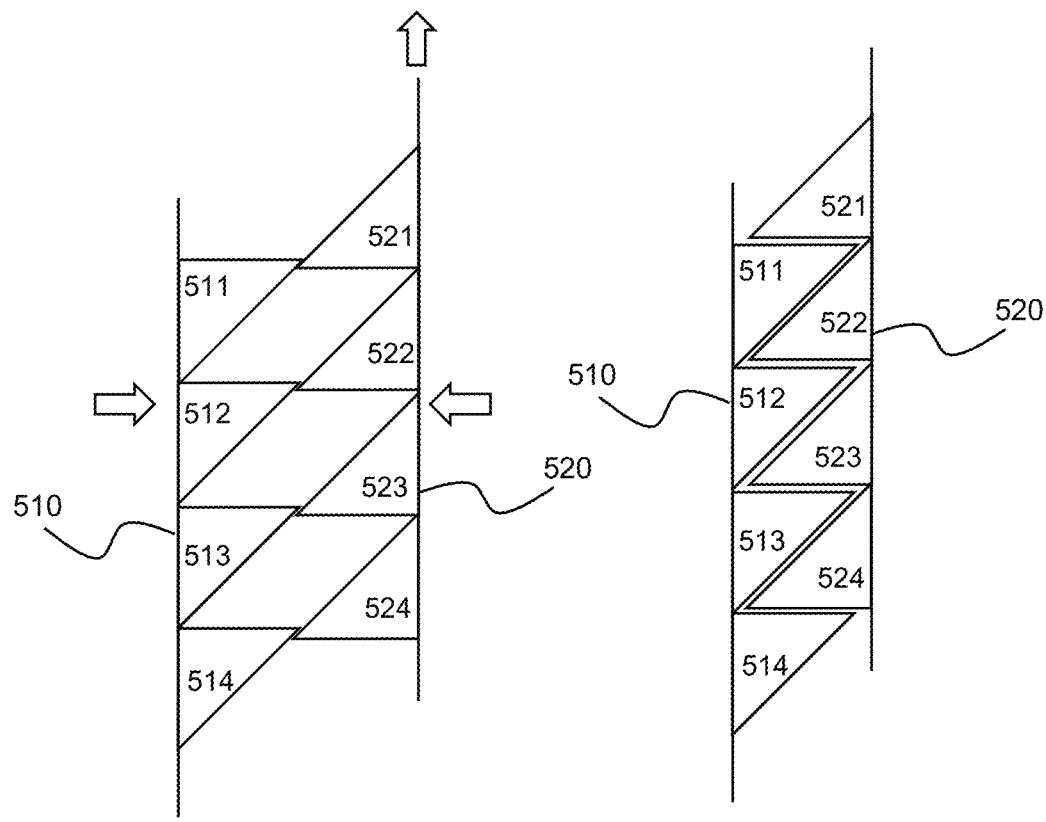

When the upward force is continuously applied on the second ratchet component 520, the second ratchet component 520 may slip further (as shown in FIG. 5C) and the contact regions of the gradual slopes of the first ratchet component 510 and the second ratchet component 520 become further reduced. When the upward force is applied further, there may be a moment where the teeth tips of the second ratchet teeth pass over the teeth tips of the first ratchet teeth, respectively. The compressive force generated by the compression component may cause the second ratchet component 520 to be engaged (or partly engaged) with the first ratchet component 510 again (as shown in FIG. 5D). In some embodiments, any mechanical component that may provide a force to cause the second ratchet component 520 to be engaged (or partly engaged) with the first ratchet component 510 again may be used besides the compression component.

As shown in the FIG. 5D, the second ratchet teeth 522, 523, and 524 may be engaged with the first ratchet teeth 511, 512, and 513, respectively. It should be noted that even though the second ratchet tooth 521 (or the first ratchet tooth 514) seems not to be engaged with any ratchet tooth in FIG. 5D, the second ratchet tooth 521 (or the first ratchet tooth 514) may be engaged with one of the first ratchet teeth if the first ratchet teeth and the second ratchet teeth are arranged in circular shapes as in the camera stand 300.

It may be noted that the steep slopes of a first ratchet tooth may also contact or face the steep slope of one corresponding second ratchet tooth. For example, the steep slope of the first ratchet tooth 512 may contact or face the steep slope of the second ratchet tooth 521. Such an arrangement may prohibit any relative movement between the first ratchet component 510 and the second ratchet component 520 when a downward force is applied on the second ratchet component 520.

Figure 6A:
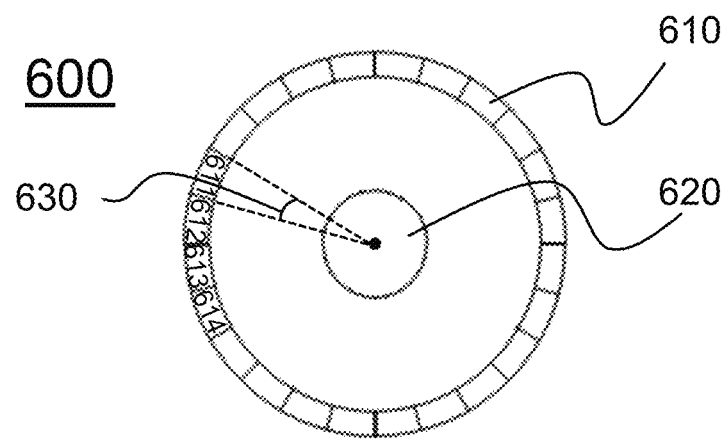
FIG. 6A is a side view of an exemplary adapter ring according to some embodiments of the present disclosure.
Figure 6B:
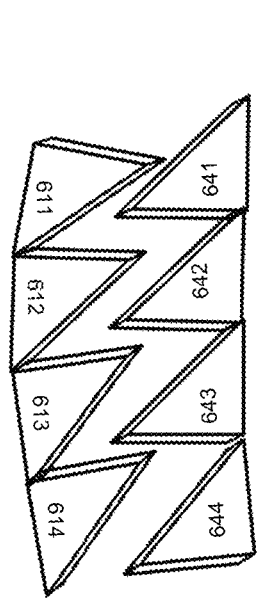
FIGS. 6B-6C are schematic diagrams illustrating relative movements between the exemplary adapter ring and a rotation component or a rotation limiting component according to some embodiments of the present disclosure.
Figure 6C:
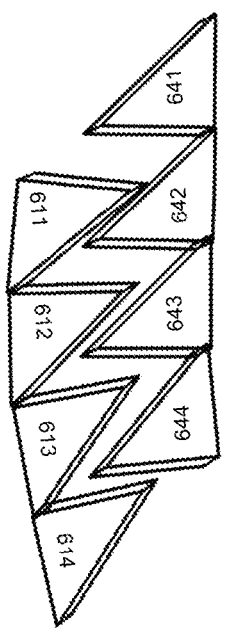

FIG. 6A is a side view of an exemplary adapter ring according to some embodiments of the present disclosure. The adapter ring 600 provides an example of the adapter ring 340 and/or the adapter ring 400. The ratchet teeth 610 may correspond to the plurality of third ratchet teeth 341 of the adaptor ring 340 or the plurality of fourth ratchet teeth 342 of the adaptor ring 340. The hole 620 may be a through hole through which a fastener may pass as described in FIG. 3. The ratchet teeth 610 may include four successive ratchet teeth 611-614. As shown in FIG. 6B, the ratchet teeth 611-614 may be engaged with the ratchet teeth 641-644. The ratchet teeth 641-644 may correspond to the first ratchet teeth 321 of the rotation component 320 (when the ratchet teeth 610 correspond to the third ratchet teeth 341 of the adaptor ring 340) or the second ratchet teeth 311 of the rotation limiting component 310 (when the ratchet teeth 610 correspond to the fourth ratchet teeth 341 of the adaptor ring 340). As shown in FIGS. 6B and 6C, the ratchet teeth 641-644 may slip over the ratchet teeth 610 by one ratchet tooth at a time. Each slip of a ratchet tooth (e.g., from 641 being engaged with 611 to 642 being engaged with 611) may need the ratchet teeth to rotate by an angle equal to 360 divided by the teeth number (or count) in degrees (angle 630 as shown in FIG. 6A).

FIGS. 7A-7D are schematic diagrams illustrating relative movements between components in an exemplary camera stand according to some embodiments of the present disclosure. FIGS. 7A-7D include simplified diagrams corresponding to FIG. 3. For example, component 730 may correspond to the rotation component 320, component 720 may correspond to the adapter ring 340, and component 710 may correspond to the rotation limiting component 310.

Ratchet teeth 731 may correspond to part of the first ratchet teeth 321 of the rotation component 320, ratchet teeth 711 may correspond to part of the second ratchet teeth 311 of the rotation limiting component 310, ratchet teeth 721 may correspond to part of the third ratchet teeth 341 of the adaptor ring 340, and the ratchet teeth 722 may correspond to part of the fourth ratchet teeth 342 of the adaptor ring 340.

Figure 7A:
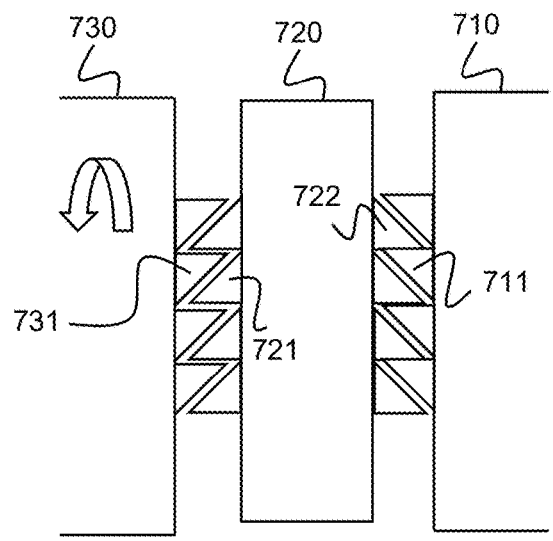
FIGS. 7A-7D are schematic diagrams illustrating relative movements between components in an exemplary camera stand according to some embodiments of the present disclosure.
Figure 7B:
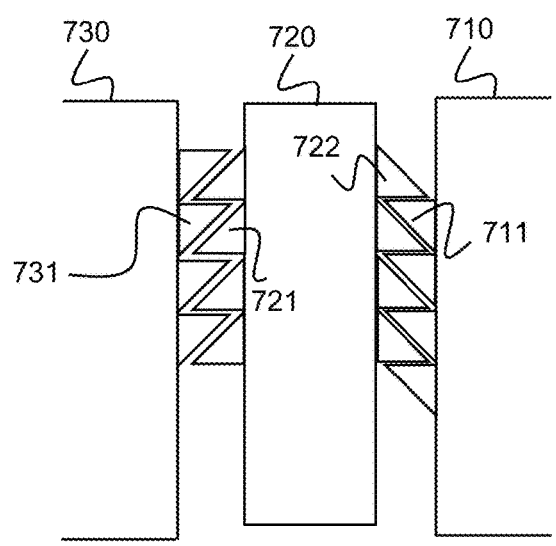
Figure 7C:
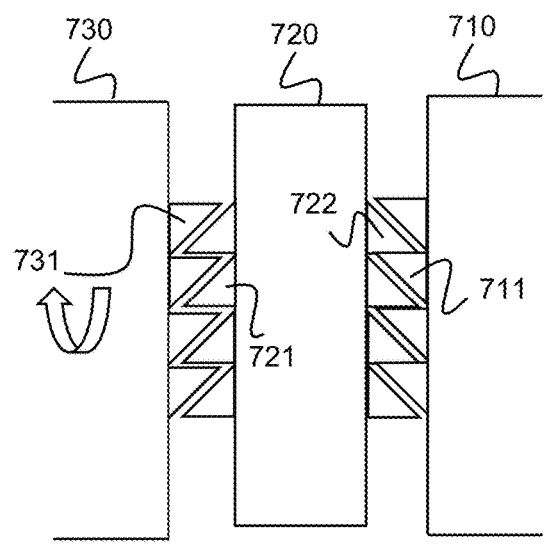
Figure 7D:
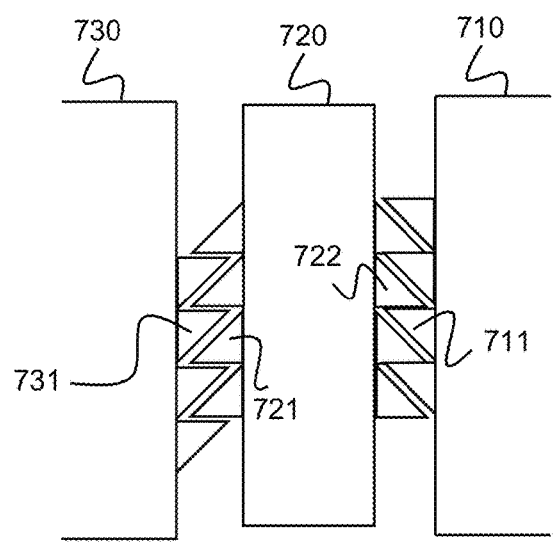

In some embodiments, the rotation component 730 may be driven to rotate about a horizontal axis (e.g., the x-x axis in FIG. 3). FIG. 7A and FIG. 7C show the initial positions of the components 710, 720, and 730 before the rotation component 730 rotates. When the component 730 is rotated anticlockwise in the left view about the horizontal axis (or upwards in the front view), the arrangement of the ratchet teeth 731 and 721 (e.g., the relative positions between the gradual slopes and the steep slopes of the ratchet teeth 731 and 721) may prohibit any relative movement between the component 730 and the component 720. However, the arrangement of the ratchet teeth 722 and 711 may allow the ratchet teeth 722 to slip along the ratchet teeth 711 (e.g., the gradual slopes of the ratchet teeth 722 to slip along the gradual slopes of the ratchet teeth 711) when rotated anticlockwise in the left view about the horizontal axis. Thus, when component 730 is rotated anticlockwise in the left view, the component 720 may rotate together with the component 730 while the component 710 remains static (as shown in FIG. 7B). Taking components in FIG. 3 as an example, when the rotation component 320 rotates at a first direction (e.g., anticlockwise in the left view) about the x-x axis, the adapter ring 340 may be static with respect to the rotation component 320.

When the component 730 is rotated clockwise in the left view about the horizontal axis (or downwards in the front view), the arrangement of the ratchet teeth 731 and 721 may allow the ratchet teeth 731 to slip along the ratchet teeth 721. However, the arrangement of the ratchet teeth 722 and 711 may prohibit any relative movement between the component 720 and the component 710 when the component 730 is rotated clockwise in the left view. Thus, when component 730 is rotated clockwise in the left view, the component 720 may rotate while the component 710 and component 720 remain static. Taking components in FIG. 3 as an example, when the rotation component 320 rotates at a second direction (e.g., clockwise in the left view) about the x-x axis, the adapter ring 340 may be static with respect to the rotation limiting component 310.

Figure 8:
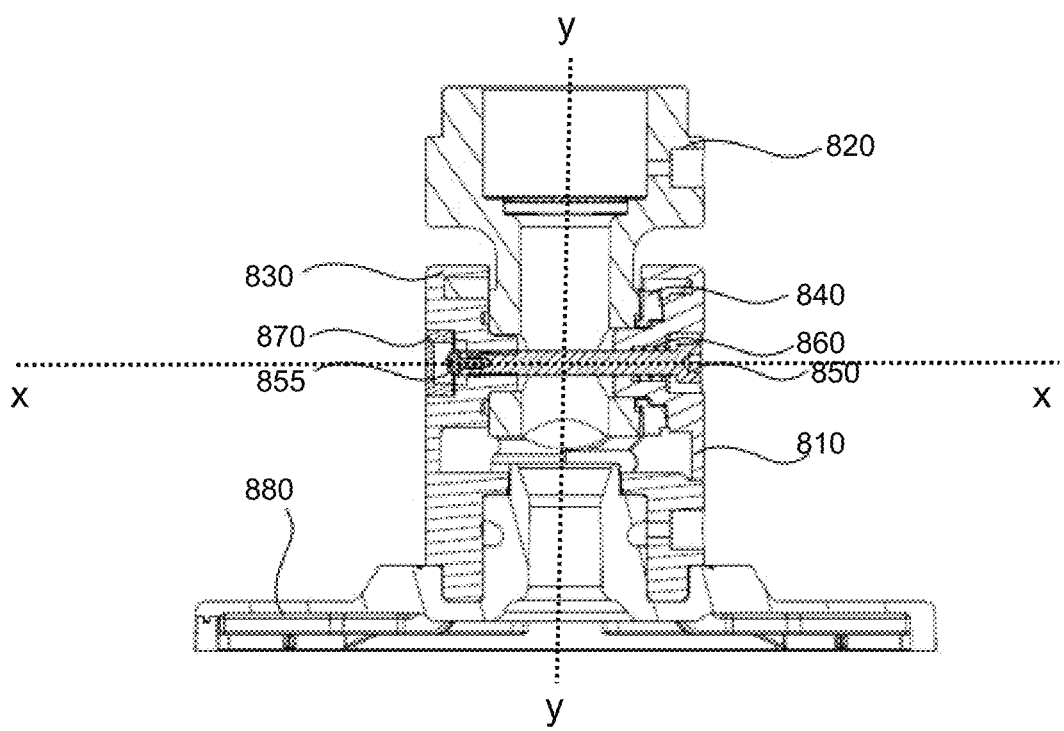
FIG. 8 is a front view of a cross-section of an exemplary camera stand according to some embodiments of the present disclosure.

FIG. 8 is a front view of a cross-section of an exemplary camera stand according to some embodiments of the present disclosure. The camera stand 800 provides an example of the camera stand 300 when the camera stand 300 is assembled. As shown in FIG. 8, an adapter ring 840 may be connected to a rotation component 820 and a rotation limiting component 810 on two different sides (e.g., opposite sides) of the adaptor ring 840. The rotation component 820 may be connected to a supporting component 830. The supporting component 830 may be connected to a base 880. The rotation component 820, the adapter ring 840 and the rotation limiting component 810 may each include a through hole along the x-x axis (or horizontal axis). A bolt 850 may pass through the through holes and a nut 855 paired with the bolt 850 may limit the width of the camera stand 800 in the horizontal direction along the horizontal axis. In some embodiments, a spring 860 may be installed on the bolt 850 between a head of the bolt 850 and the holes (e.g., the hole near the surface of the rotation limiting component 810). For example, the spring 860 may be relaxed at an initial configuration of the camera stand 800. The supporting component 830 may rotate about the y-y axis (or referred to as a second rotation axis) with respect to a base 880. The y-y axis may be a vertical axis perpendicular to the x-x axis. The rotation of the supporting component 830 about the y-y axis may cause the rotation component 820, the adapter ring 840, and the rotation limiting component 810 to rotate simultaneously as a rigid body with the supporting component 830. In some embodiments, the bottom surface of the base 880 may be attached to a surface of a fixed structure (e.g., a wall, a ceiling, a floor) or a movable structure (e.g., a stand support such as a tripod, a shelf).

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A stand, comprising:
   a supporting component;
   a rotation component rotatably connected to the supporting component,
   configured to rotate about a first rotation axis, wherein the rotation component includes a plurality of first ratchet teeth arranged along a first circle on a first side of the rotation component;
   a rotation limiting component, wherein the rotation limiting component includes a plurality of second ratchet teeth arranged along a circle on a second side of the rotation limiting component, the second side of the rotation limiting component facing the first side of the rotation component; and
   an adapter ring placed between the rotation component and the rotation limiting component, wherein the adapter ring includes a plurality of third ratchet teeth arranged along a third circle on a third side of the adapter ring and a plurality of fourth ratchet teeth arranged along a fourth circle on a fourth side of the adapter ring, wherein the plurality of third ratchet teeth are engaged with the plurality of first ratchet teeth and the plurality of fourth ratchet teeth are engaged with the plurality of second ratchet teeth.

2. The stand of claim 1, wherein
each of at least some of the plurality of third ratchet teeth and at least some of the plurality of fourth ratchet teeth includes a steep slope and a gradual slope,
the steep slope and the gradual slope form a tooth tip, and
a first angle formed between two teeth tips of two adjacent third ratchet teeth with respect to a center of the third circle is different from a second angle formed between two teeth tips of two adjacent fourth ratchet teeth with respect to a center of the fourth circle.

3. The stand of claim 2, wherein a difference between the first angle and the second angle is between 0.3 and 0.7 degrees.

4. The stand of claim 1, wherein a rotation direction of the third ratchet teeth is the same as a rotation direction of the fourth ratchet teeth.

5. The stand of claim 1, wherein the supporting component is rotatably connected to a base, and the supporting component rotates about a second rotation axis perpendicular to the first rotation axis.

6. The stand of claim 1, wherein the rotation component is operably connected to a camera.

7. The stand of claim 1, further includes:
a fastener configured to limit movement of at least one of the supporting component, the rotation component, the adapter ring, or the rotation limiting component about the first rotation axis.

8. The stand of claim 7, wherein each of the supporting component, the rotation component, the adapter ring, and the rotation limiting component includes a hole along the first rotation axis, and
the fastener includes:
a bolt passing through the holes of the supporting component, the rotation component, the adapter ring, and the rotation limiting component; and
a nut paired with the bolt, configured to limit the movement of the supporting component, the rotation component, the adapter ring, and the rotation limiting component about the first rotation axis.

9. The stand of claim 8, wherein the fastener further includes:
a spring installed on the bolt between a head of the bolt and the holes,
configured to force an engagement between the plurality of third ratchet teeth and the plurality of first ratchet teeth or an engagement between the plurality of fourth ratchet teeth and the plurality of second ratchet teeth.

10. The stand of claim 1, wherein
when the rotation component rotates at a first direction about the first rotation axis, the adapter ring is static with respect to the rotation component; and
when the rotation component rotates at a second direction about the first rotation axis, the adapter ring is static with respect to the rotation limiting component, the second direction being different from the first direction.

11. A system, comprising:
an imaging apparatus; and
a stand connected to the imaging apparatus, the stand comprising:
a supporting component;
a rotation component rotatably connected to the supporting component, configured to rotate about a first rotation axis, wherein the rotation component includes a plurality of first ratchet teeth arranged along a first circle on a first side of the rotation component;
a rotation limiting component, wherein the rotation limiting component includes a plurality of second ratchet teeth arranged along a circle on a second side of the rotation limiting component, the second side of the rotation limiting component facing the first side of the rotation component; and
an adapter ring placed between the rotation component and the rotation limiting component, wherein the adapter ring includes a plurality of third ratchet teeth arranged along a third circle on a third side of the adapter ring and a plurality of fourth ratchet teeth arranged along a fourth circle on a fourth side of the adapter ring,
wherein the plurality of third ratchet teeth are engaged with the plurality of first ratchet teeth and the plurality of fourth ratchet teeth are engaged with the plurality of second ratchet teeth.

12. The system of claim 11, wherein
each of at least some of the plurality of third ratchet teeth and at least some of the plurality of fourth ratchet teeth includes a steep slope and a gradual slope,
the steep slope and the gradual slope form a tooth tip, and
a first angle formed between two teeth tips of two adjacent third ratchet teeth with respect to a center of the third circle is different from a second angle formed between two teeth tips of two adjacent fourth ratchet teeth with respect to a center of the fourth circle.

13. The system of claim 12, wherein a difference between the first angle and the second angle is between 0.3 and 0.7 degrees.

14. The system of claim 11, wherein a rotation direction of the third ratchet teeth is the same as a rotation direction of the fourth ratchet teeth.

15. The system of claim 11, wherein the supporting component is rotatably connected to a base, and the supporting component rotates about a second rotation axis perpendicular to the first rotation axis.

16. The system of claim 11, wherein the rotation component is operably connected to the imaging apparatus.

17. The system of claim 11, further includes:
a fastener configured to limit movement of at least one of the supporting component, the rotation component, the adapter ring, or the rotation limiting component about the first rotation axis.

18. The system of claim 17, wherein each of the supporting component, the rotation component, the adapter ring, and the rotation limiting component includes a hole along the first rotation axis, and
the fastener includes:
a bolt passing through the holes of the supporting component, the rotation component, the adapter ring, and the rotation limiting component; and
a nut paired with the bolt, configured to limit the movement of the supporting component, the rotation component, the adapter ring, and the rotation limiting component about the first rotation axis.

19. The stand of claim 18, wherein the fastener further includes:
a spring installed on the bolt between a head of the bolt and the holes,
configured to force an engagement between the plurality of third ratchet teeth and the plurality of first ratchet teeth or an engagement between the plurality of fourth ratchet teeth and the plurality of second ratchet teeth.

20. The stand of claim 11, wherein
when the rotation component rotates at a first direction about the first rotation axis, the adapter ring is static with respect to the rotation component; and
when the rotation component rotates at a second direction about the first rotation axis, the adapter ring is static with respect to the rotation limiting component, the second direction being different from the first direction.

* * * * *